United States Patent [19]

Wemhoff

[11] Patent Number: 4,834,836
[45] Date of Patent: May 30, 1989

[54] METHOD AND APPARATUS FOR POLLUTION CONTROL OF LIQUID WASTES

[75] Inventor: Mark F. Wemhoff, Enterprise, Fla.

[73] Assignee: Environmental Tech America, Inc., Sanford, Fla.

[21] Appl. No.: 158,843

[22] Filed: Feb. 22, 1988

Related U.S. Application Data

[63] Continuation-in-part of Ser. No. 935,770, Nov. 28, 1986, Pat. No. 4,735,728, which is a continuation-in-part of Ser. No. 770,609, Aug. 29, 1985, Pat. No. 4,640,769.

[51] Int. Cl.$^4$ .............................. C02F 1/32; C02F 1/04
[52] U.S. Cl. ................................. 159/23; 422/186.08; 422/186.3; 210/180; 210/241
[58] Field of Search ............... 210/748, 760, 774, 180, 210/218, 241, 192, 180; 203/31; 159/47.3, 23, 22; 422/186.3, 186.08

[56] References Cited

U.S. PATENT DOCUMENTS

| | | | |
|---|---|---|---|
| 3,127,243 | 3/1964 | Konikoff | 203/DIG. 5 |
| 3,421,999 | 1/1969 | Corwin | 422/186.08 |
| 4,012,321 | 3/1977 | Koubek | 210/748 |
| 4,735,728 | 4/1988 | Wemhoff | 210/748 |

Primary Examiner—Benoit Castel
Attorney, Agent, or Firm—Robert M. Skolnik

[57] ABSTRACT

An apparatus for pollution control in treating the effluent employs an evaporation stage where the effluent solutions are heated to 150° Fahrenheit. The resulting steam and vapors are then oxidized by photoysis and photolytic catayzed ozone before the steam and vapors are discharged through a rubber coated dryer duct. The apparatus is comprised of two main units, a lower evaporation sump unit and an upper photolysis and blower unit. The sump is manually filled through a port located in the top of the blower unit. The operator will then switch the main power switch to "ON" and activate the system. This includes activation of an ultraviolet lamp, blower and heat belts. The heat belts are fixed around the base of the sump.

4 Claims, 1 Drawing Sheet

U.S. Patent  May 30, 1989  4,834,836
FIG. 1
FIG. 2
FIG. 3
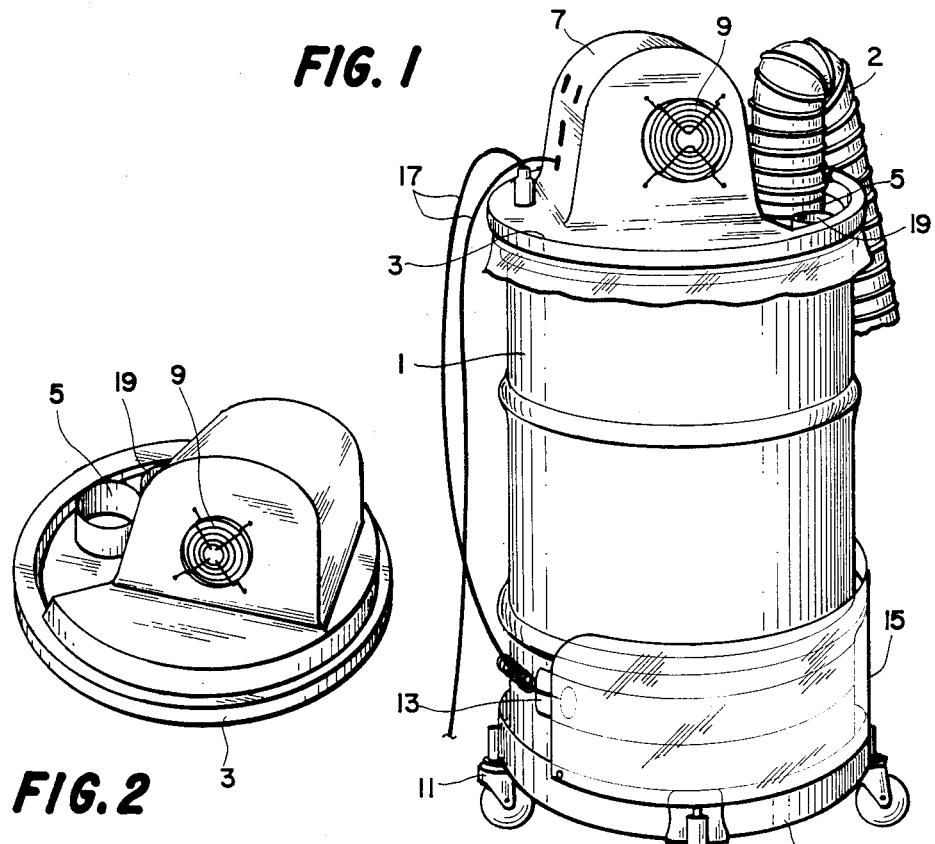
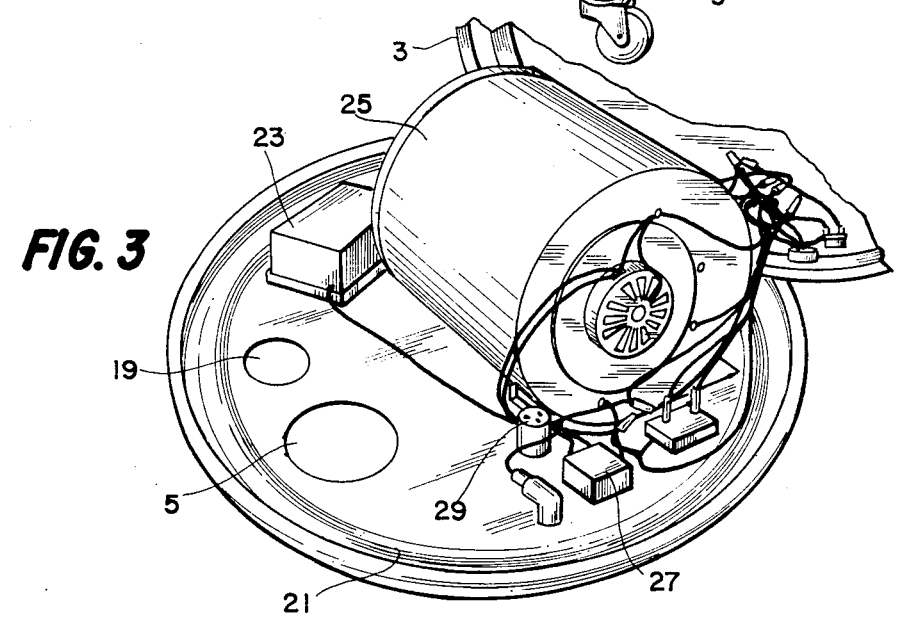

METHOD AND APPARATUS FOR POLLUTION CONTROL OF LIQUID WASTES

CROSS-REFERENCE TO RELATED APPLICATIONS

This application is a continuation-in-part of my U.S. patent application Ser. No. 935,770, filed Nov. 28, 1986, now U.S. Pat. No. 4,735,728 issued Apr. 5, 1988, which is in turn, a continuation-in-part of my U.S. Pat. No. 4,640,769, issued Feb. 3, 1987, on application Ser. No. 770,609, filed Aug. 29, 1985, all commonly assigned.

FIELD OF THE INVENTION

This invention relates to an apparatus for pollution abatement in the treatment of liquids containing dissolved salts, metals, organics and particulates by means of positive pressure atmospheric evaporation and photo-oxidation. The apparatus involves the application of a combination of technologies for treatment of hazardous and nonhazardous liquid wastes.

DESCRIPTION OF THE PRIOR ART

In my aforementioned U.S. Pat. No. 4,640,769, issued Feb. 3, 1987, I disclose and claim a method and apparatus for treating effluent, specifically, the effluent from convenience type photographic processing equipment.

The invention of this patent includes an evaporator having a heat source for separating vaporized water and volatile organic compounds from solids and complexed ionic metals in the effluent; a photolytic cell and ozone generator where the vapor was subjected to UV and to ozone; a condenser stage for forming a condensate from the UV/ozone treated vapors; and an activated carbon adsorption cell for further purifying the condensate.

My U.S. Pat. No. 4,735,728, issued Apr. 5, 1988 based on application Ser. No. 935,770, filed Nov. 28, 1986 covers the method for treating photographic processing effluents comprising the steps of filtering the effluent; evaporating the effluent to create steam and vapors; oxidizing the steam and vapors by photolysis and photolytic catalyzed ozone; condensing the treated steam and vapors, and filtering the resultant condensate.

The methods and apparatus disclosed in my patents as aforesaid have proven to be useful; however, it is now apparent that the convenience photographic processors to which the inventions my patents are directed are very concerned with costs and that these commercial considerations dictate that the method and apparatus involved operate within legal limits for effluent treatment and at the least possible costs.

Accordingly, while the present invention incorporates some of the unit operations disclosed in my patents, the invention offers the market the required low cost system.

This is accomplished in the present invention by eliminating all of the filtering steps of my prior patents. In addition, the present invention does not involve the steps of or apparatus for recondensing vapors and handling condensed liquids.

SUMMARY OF THE INVENTION

The operation of the present invention is to first pour the liquid into a steel drum which serves as the sump. The apparatus consisting of the heat belts, blower and UV lamp, is then turned on. The liquids are evaporated leaving only solids in the steel drum. The heat belts transfer heat to the drum and the blower serves to increases the evaporation rate of the liquids in the sump, exhaust the vapors to the exterior, and to supply air for ozone generation. There is no condensing coils or liquids condensed. The evaporator is designed to handle any neutral pH aqueous liquids, however, solvents in <0.1% concentration in an aqueous solutions are also permitted to be used.

The first step in the process is an evaporation stage where the effluent solutions are heated to 150° Fahrenheit. The resulting steam and vapors are then oxidized by photolysis and photolytic catalyzed ozone before the steam and vapors are discharged through a rubber coated dryer duct. This process is implemented in an apparatus designed to treat all liquids, semi-solid wastes, but specifically suitable for use in the treatment of washless photo chemistries. The apparatus is comprised of two main units, a lower evaporation sump unit and an upper photolysis and blower unit.

The sump is manually filled through a port located in the top of the blower unit. The sump is a phenolic resin, coal tar painted 30 gallon or 55 gallon DOT approved steel drum. The operator will then switch the main power switch to "ON" and activate the system. This includes activation of an ultraviolet lamp, blower, air pump and heat belts. The heat belts are fixed around the base of the sump.

Heat is supplied to the drum by electric heat belts. The heat belts are supplied with or without variable resistors to control the heat output and are used singly or in combination. The wattage ranges from 705 watts to 1000 watts.

The blower for the 30 gallon drum is a shaded pole blower of 320 CFM and 465 CFM for the 55 gallon drum.

As the solution is brought up to 150° Fahrenheit and the steam and vapors are generated, they are oxidized in the reaction space in the evaporator by interaction with the ultraviolet light and ozone. In the preferred embodiment, the ultraviolet lamp is a 4 watt bulb with emissions at and around 254 nanometers (NM). Ozone is generated according to $O_2 + UV \rightarrow O_3$.

A 1,300 cubic centimeter/minute air pump with a tube attached is provided to agitate the liquid being evaporated in the sump. The tube is directed to the bottom of the sump.

The combination of ozone and ultraviolet light provides direct catalytic oxidation of the vapors as they are generated. In addition, the positive air pressure in the evaporator aids in the transport of the steam and vapors.

Heretofore, evaporation, photolysis, photo-oxidation have each been employed as unit operations in pollution abatement and resource recovery. No combination of such unit operations had heretofore been developed which was capable of providing suitable pollution abatement and resource recovery.

Methods now in use recover metals by metallic replacement, reverse osmosis, ion exchange, chemical precipitation, electro-winning, evaporation, and other techniques. However, these methods are also not capable of reducing the biological and chemical oxygen demand (BOD/COD) caused by certain volatile organic compounds which may be present.

Further disadvantages, particular to each field, industry, process or type of effluent to which pollution abatement and resource recovery by the combination of evaporation, photolysis, photo-oxidation, might apply, also render the methods now in use impractical, for reasons which relate to the primary disadvantages outlined above.

Accordingly, several objects of my invention are as follows:

Effective metals removal - The invention recovers metals efficiently and in such form as to render them economically beneficial to the waste generator.

Reduction of volatile organic compounds - The invention reduces volatile organic compounds.

Compact size - The apparatus of the invention has dimensions which are uniquely suitable for operation in confined areas.

Skill requirement - The simplicity and semi-automatic operations of the invention is unique and requires no operator training.

A further object of my invention is the provision of a pollution control device which can be used in the local offices of the user and processor of industrial wastewater. Another object of my invention is the provision of a device which can process sludge for reclamation. A still further object of the invention is the provision of ozone treatment for the effluent. An important object of the invention is the provision of a method and apparatus which employs a number of different treatment operations in a single stage.

BRIEF DESCRIPTION OF THE DRAWINGS

These as well as further objects and advantages of the invention will become apparent to those skilled in the art from a review of the following detailed specification reference being made to the accompanying drawings in which:

FIG. 1 is a side view of the apparatus of the invention;

FIG. 2 is a top view of the housing cover employed in the invention; and

FIG. 3 is a top view of the cover support and subassembly apparatus employed in the invention.

DETAILED DESCSRIPTION OF THE INVENTION

The sump unit is a 30 or 55 gallon D.O.T. approved steel drum serving as the sump. The interior of the drum is coated with a phenolic resin and painted with a coal tar epoxy. The drum is set on a castered dolly to aid in mobility. The regular drum lid is removed and retained for sealing the drum when it is filled with evaporated solids prior to shipment.

A modified lid is installed. This modified lid contains a 110 volt AC power cord, two 110 volt AC receptacles for powering the heat belt(s), an OFF-ON switch, a shaded pole blower vented into the sump, air pump with below liquid level tube, a fill port, UV lamp for ozone production, and exhaust port. All these items are contained under a molded plastic housing.

The heat belts are wrapped around the base of the sump and attached by spring clips.

As shown in FIG. 1, the sump 1, is a steel drum with its lid removed. The inside of the drum (not shown) is coated with phenolic resin and painted with a coal tar epoxy. As discussed above, the lid of the drum 1 is replaced by the special lid consisting of a base member and a cover 3 of the present invention. This lid contains various of the subsystems employed in the invention. As will be understood, the drum 1 eventually fills with solids and is used as the shipping container for the waste solids so that the original lid (not shown) supplied with the drum is retained to seal the filled drum during shipment to a disposal site.

The special lid cover 3 in FIG. 1 overfits the top of the drum 1. The drum 1 is mounted on a set of casters (one of which is shown at 11 in FIG. 1). The casters 11 are mounted on a circular support base 9 as is well known in the art.

Also shown in FIG. 1 are the heat belts which provide a source of heat from electrical outlets for evaporating the liquid contents of the sump drum 1. This heat belt is shown at 13 in FIG. 1 and is safely shielded from the touch by a protective covering 15. Thus, the heat from the electrically heated belt 13 cannot come into contact with persons or property which may be in proximity to the apparatus during its operation. If desird, several of belts 13 may be employed.

The special lid cover 3 contains an air exhaust aperture 5 and a fill aperture 19 (for pouring the liquid to be treated into the sump), and blower air intake 9 covered by a protective safety grating as is known in the art. The exhaust port aperture 5 is coupled to the exterior for venting to outside air via rubber coated dryer duct 2.

Electrical wires 17 connect the power source to the apparatus and couple power between the heat belts and the remainder of the subsystems.

FIG. 2 is a perspective view of the lid cover 3. More particularly, in FIG. 2, the cover 3 is formed of a molded housing containing the liquid fill aperture 5 and the air exhaust aperture 19. The air intake 9 for the blower is also formed in the housing 3.

FIG. 3 shows the flattened base portion 21 of the cover lid assembly. This circular base portion 21 mounts and supports several of the subsystems employed in this invention and overfits onto drum sump 1. Cover 3 overfits and shields base portion 21.

More particularly, in FIG. 3, numerals 19 and 5 again denote the liquid fill and air exhaust apertures, respectively. The blower fan is shown at 25. If required, an air pump agitator 23 is provided. The pump agitator 23 is connected to a tube which is caused to be inserted into the sump below the surface of the liquid to be treated to provide agitation to aid in evaporation (as discussed above).

The mounting for the UV light source is a UV light bulb socket 29. The socket 29 is electrically connected to an electrical transformer 27 to power the UV light bulb.

As modifications to the foregoing may be made without departing from the spirit and scope of my invention, what is sought to be protected is set forth in the appended claims.

I claim:

1. Apparatus for treating liquids wastes comprising: a drum having a fill port for receiving liquid wastes; heating means including heat belt means coupled about the periphery of said drum for heating said liquid wastes to generate an evaporate; blower means coupled to said drum for circulating air in said drum and thereby accelerating said evaporation; ultra-violet light source means coupled to said drum for treating said evaporate by photolysis and ozonation; means connected to said drum for exhausting said treated evaporate from said drum; support surface means mounted on said drum, said blower means and said ultra-violet light source means being mounted on said support surface.

2. The apparatus of claim 1 further including wheeled support means coupled to said drum to enable said apparatus to be easily moveable.

3. The apparatus of claim 1 further including protective shield means mounted over said heat belt to prevent said belt from contacting persons or property in the vicinity of said apparatus.

4. The apparatus of claim 1, further including an air hose, air pump means coupled to said sump and to said air hose, said air hose extending into said liquid waste for agitating said liquid waste to enhance the evaporation of said liquid waste.

* * * * *